United States Patent
Uesu et al.

(10) Patent No.: US 10,072,706 B2
(45) Date of Patent: Sep. 11, 2018

(54) BEARING DEVICE FOR CRANKSHAFT OF INTERNAL COMBUSTION ENGINE

(71) Applicant: DAIDO METAL COMPANY LTD., Nagoya (JP)

(72) Inventors: Yusuke Uesu, Inuyama (JP); Yasushi Saito, Inuyama (JP)

(73) Assignee: Daido Metal Company Ltd., Nagoya (JP)

( * ) Notice: Subject to any disclaimer, the term of this patent is extended or adjusted under 35 U.S.C. 154(b) by 0 days.

(21) Appl. No.: 15/730,973

(22) Filed: Oct. 12, 2017

(65) Prior Publication Data
US 2018/0135695 A1    May 17, 2018

(30) Foreign Application Priority Data
Nov. 15, 2016  (JP) .................. 2016-222426

(51) Int. Cl.
*F16C 9/02* (2006.01)
*F16C 33/10* (2006.01)
*F16C 17/02* (2006.01)
*F01M 1/06* (2006.01)

(52) U.S. Cl.
CPC ............ *F16C 33/1065* (2013.01); *F16C 9/02* (2013.01); *F16C 17/022* (2013.01); *F16C 33/1045* (2013.01); *F01M 2001/062* (2013.01)

(58) Field of Classification Search
CPC ...... F16C 9/02; F16C 3/04; F16C 3/14; F16C 17/022; F16C 19/14; F16C 33/046; F16C 33/1045; F16C 33/1065; F16C 33/6666; F16C 2204/10; F16C 2204/20; F01M 1/06; F01M 2001/062; F01M 11/02; F01M 2011/026
See application file for complete search history.

(56) References Cited

U.S. PATENT DOCUMENTS

| 6,491,438 | B1 * | 12/2002 | Ono .......................... F16C 9/02 384/288 |
| 7,281,854 | B2 * | 10/2007 | Terada ...................... F01M 1/06 384/288 |
| 8,317,401 | B2 * | 11/2012 | Matsuyama .............. F16C 9/02 384/288 |

(Continued)

FOREIGN PATENT DOCUMENTS

| JP | H08-277831 A | 10/1996 |
| JP | 2006-125565 A | 5/2006 |

(Continued)

*Primary Examiner* — Alan B Waits
(74) *Attorney, Agent, or Firm* — Snyder, Clark, Lesch & Chung, LLP (57) ABSTRACT

A bearing device includes a crankshaft having a plurality of journal portions, main bearings for supporting the crankshaft, and a bearing housing. The plurality of journal portions includes a first journal portion with a lubricating oil passage and a second journal portion without the lubricating oil passage. The first and second journal portions are supported by the first and second main bearings. The bearing housing includes an upper-side housing and a lower-side housing. A length of a crush relief of at least an upper-side halved bearing of the second main bearing is larger than a length of the crush relief of each of upper-side and lower-side halved bearings of the first main bearing.

5 Claims, 7 Drawing Sheets

(56) References Cited

U.S. PATENT DOCUMENTS

| | | | |
|---|---|---|---|
| 8,608,385 B2* | 12/2013 | Ovares | F16C 9/02 384/283 |
| 2005/0047689 A1* | 3/2005 | Yamazaki et al. | F16C 9/02 384/288 |
| 2005/0263125 A1* | 12/2005 | Terada | F01M 1/06 123/196 R |
| 2010/0316312 A1* | 12/2010 | Maitani | F16C 9/00 384/288 |
| 2012/0294558 A1* | 11/2012 | Ovares | F16C 9/02 384/288 |
| 2017/0152885 A1* | 6/2017 | Kato | F01M 11/02 |

FOREIGN PATENT DOCUMENTS

| | | |
|---|---|---|
| JP | 2008-196396 A | 8/2008 |
| WO | 2004038188 A1 | 5/2004 |

\* cited by examiner

BEARING DEVICE FOR CRANKSHAFT OF INTERNAL COMBUSTION ENGINE

INCORPORATION BY REFERENCE

The present application claims priority from JP Patent Application Ser. No. 2016-222426 filed on Nov. 15, 2016, the content of which is hereby incorporated by reference into this application.

BACKGROUND OF THE INVENTION

1. Field of the Invention

The present invention relates to a bearing device for a crankshaft of an internal combustion engine.

2. Description of the Related Art

A crankshaft of a multi-cylinder internal combustion engine has a plurality of journal portions and a plurality of crank pin portions. The plurality of journal portions includes a journal portion A with a lubricating oil passage (hereinafter, simply referred to as a "journal portion A") for supplying oil to the crank pin portions and a journal portion B without the lubricating oil passage (hereinafter, simply referred to as a "journal portion B"). The crankshaft is supported by a cylinder block lower portion of the internal combustion engine through a main bearing A in the journal portion A, and through a main bearing B in the journal portion B. Each of the main bearings A and B has a cylindrical shape with a pair of halved bearings assembled to a bearing holding hole of a bearing housing. The bearing housing includes an upper-side housing which is part of the cylinder block and a lower-side housing which is a bearing cap. To lubricate the main bearings A and B, oil discharged by an oil pump is fed into oil grooves formed along inner circumferential surfaces of the main bearings A and B through an oil gallery formed in a wall of the cylinder block and through holes formed in walls of the main bearings A and B. In the journal portion A, a first lubricating oil passage is formed through the journal portion A in a diameter direction, and communicates with the oil groove of the main bearing A at both end openings thereof. Furthermore, a second lubricating oil passage is formed so as to branch off from the first lubricating oil passage and pass through a crank arm portion, and communicates with a third lubricating oil passage formed through the crank pin portion in a diameter direction of the crank pin portion. Therefore, oil fed into the oil groove of the main bearing A passes through the first lubricating oil passage, the second lubricating oil passage, and the third lubricating oil passage. Thereafter, the oil is supplied from an end opening (oil outlet formed on an outer circumferential surface of the crank pin portion) of the third lubricating oil passage to a sliding surface between the crank pin portion and a connecting rod bearing.

The main bearing A and the main bearing B having the same shape are used. An oil groove is formed on at least one inner circumferential surface of a pair of halved bearings included in a main bearing, and the oil groove is formed over the entire circumferential length of the halved bearing (FIG. 1 in JP-A-08-277831). In this case, in the main bearing B, oil in an amount more than the amount required for lubricating an inner circumferential surface of the main bearing B is supplied.

Regarding the main bearing B, a bearing device for reducing the amount of oil supplied to the main bearing B by removing an oil groove of a halved bearing BU on a cylinder block side, and causing oil supplied from an outside through an oil hole formed through an inner circumferential surface and an outer circumferential surface of the halved bearing BU to flow into a gap between an inner circumferential surface of the main bearing B and a surface of the journal portion B has been proposed (WO 2004/038188 A). Furthermore, in the main bearing A of this bearing device, both circumferential end portions of an oil groove formed on an inner circumferential surface of one halved bearing AU in a circumferential direction do not communicate with a crush relief formed at both circumferential end portions of an inner circumferential surface of the halved bearing AU. In this way, by making the oil groove of the halved bearing AU a partial groove structure, flowing out of oil in the oil groove to an outside of the main bearing A through a gap by the crush relief is suppressed. According to the bearing device of WO 2004/038188 A, the amount of oil to be supplied to the plurality of main bearings A and B of the bearing device can be reduced. Thus, an oil pump can be downsized, and an internal combustion engine with low fuel consumption can be achieved.

An object of JP-A-2006-125565 is to overcome such a disadvantage of the bearing device (disclosed in FIG. 5) of WO 2004/038188 A that the main bearing B is insufficiently cooled, and durability of the main bearing B decreases. In the bearing device of JP-A-2006-125565, an oil groove is partially formed on an inner circumferential surface of one halved bearing BU of the main bearing B. This oil groove extends in a circumferential direction of the inner circumferential surface including a central position in the circumferential direction of the halved bearing BU and is formed until slightly before the both end portions in the circumferential direction (paragraph [0009]). Thus, since the amount of oil to be supplied to the inner circumferential surface of the main bearing B can be increased, it is possible to prevent durability of the main bearing B from deteriorating.

In the bearing device of JP-A-2006-125565, at the time of starting an internal combustion engine, oil supplied into a partial oil groove disposed on an inner circumferential surface of the halved bearing BU assembled into an upper-side housing is in a state of high viscosity, and it is difficult for the oil to flow out from inside the oil groove to an outside. Therefore, oil is not supplied early to the inner circumferential surface of the other halved bearing BL assembled into a lower-side housing. For this reason, the inner circumferential surface of the other halved bearing BL is damaged.

Furthermore, in recent years, in an internal combustion engine for a passenger car, in order to miniaturize an oil pump as in JP-A-2008-196396, the amount of oil to be supplied to a main bearing B of a journal portion without a lubricating oil passage therein is smaller than the amount of oil to be supplied to a main bearing A of a journal portion with a lubricating oil passage therein. Therefore, at the time of starting the internal combustion engine, it is difficult for oil to be supplied to a sliding surface of a halved bearing BL not forming an oil groove assembled into a bearing cap side, and the inner circumferential surface of the halved bearing BL may be damaged.

SUMMARY OF THE INVENTION

An object of the present invention is to provide a bearing device for a crankshaft of an internal combustion engine, supplying oil early to a bearing gap at the time of starting an internal combustion engine from a low temperature state, and capable of reducing the amount of oil supplied during normal operation.

In order to solve the above problems, the present invention provides a bearing device (1) for a crankshaft of an internal combustion engine, including a crankshaft (3) having a plurality of journal portions (61, 62) and a plurality of crank pin portions (5), main bearings (41, 42) for supporting the crankshaft (3), and a bearing housing (8) for holding the main bearings (41, 42), in which the plurality of journal portions includes a first journal portion (61) with a lubricating oil passage (63a) for feeding oil to the crank pin portions of the crankshaft, and a second journal portion (62) without the lubricating oil passage, the first journal portion (61) is supported by a first main bearing (41), and the first main bearing (41) includes a pair of an upper-side halved bearing (41U) and a lower-side halved bearing (41L) each having a half-cylindrical shape, the second journal portion (62) is supported by a second main bearing (42), and the second main bearing (42) includes a pair of an upper-side halved bearing (42U) and a lower-side halved bearing (42L) each having a half-cylindrical shape, the bearing housing (8) includes an upper-side housing (81) and a lower-side housing (82), the upper-side housing has a half-cylindrical surface (83a) aligned with an outer circumferential surface of the upper-side halved bearing, the lower-side housing has a half-cylindrical surface (83b) aligned with an outer circumferential surface of the lower-side halved bearing, the upper-side halved bearings (41U, 42U) are held on the half-cylindrical surface (83a) of the upper-side housing, and the lower-side halved bearings (41L, 42L) are held on the half-cylindrical surface (83b) of the lower-side housing, an inner oil passage (G2) for supplying oil to the first and second main bearings is formed inside the upper-side housing, and an opening (G2c) of the inner oil passage (G2) is formed on the half-cylindrical surface (83a) of the upper-side housing, the upper-side halved bearings (41U, 42U) out of the pair of halved bearings have at least one oil hole (45), the upper-side halved bearing (41U) of the first main bearing (41) has an oil groove (41G), the oil hole (45) penetrates a bearing wall thickness of the upper-side halved bearings (41U, 42U), and is open on an outer circumferential surface, the opening (G2c) of the inner oil passage (G2) of the upper-side housing (81) and the oil groove (41G) of the upper-side halved bearing (41U) of the first main bearing (41) communicate with each other through the oil hole (45), the opening (G2c) of the inner oil passage (G2) of the upper-side housing (81) and an inner circumferential surface (71) of the upper-side halved bearing (42U) of the second main bearing (42) communicate with each other through the oil hole (45), each of the upper-side and lower-side halved bearings (41U, 41L, 42U, 42L) has crush reliefs (70) formed at both circumferential end portions of an inner circumferential surface thereof, lengths (L1) of the crush reliefs (70) of the upper-side and lower-side halved bearings (41U, 41L) of the first main bearing (41) are the same as each other, and a length (L2) of the crush relief (70) of at least the upper-side halved bearing (42U) of the second main bearing (42) or a length (L2) of the crush relief (70) of each of the upper-side and lower-side halved bearings (42U, 42L) is larger than the length (L1) of the crush relief (70) of each of the upper-side and lower-side halved bearings (41U, 41L) of the first main bearing (41). Note that the length of the crush relief (70) is a length between a circumferential end face (72) of the halved bearings (41U, 41L, 42U, 42L) along an inner circumferential surface (an imaginary inner circumferential surface in a case of not forming the crush relief (70)) of the halved bearings (41U, 41L, 42U, 42L) and an end position of the crush relief (70) on a circumferential central side of the halved bearings (41U, 41L, 42U, 42L). The terms "upper-side" and "lower-side" do not limit arrangement of the configuration of the present invention, and the arrangement of the present invention can be made in any orientation.

In another embodiment of the present invention, the length (L2) of the crush relief (70) of at least the upper-side halved bearing (42U) of the second main bearing (42) or the length (L2) of the crush relief (70) of each of the upper-side and lower-side halved bearings (42U, 42L) is equal to or longer than twice the length (L1) of the crush relief (70) of each of the upper-side and lower-side halved bearings (41U, 41L) of the first main bearing (41) (that is, L2≥L1×2).

In another embodiment of the present invention, the length (L2) of the crush relief (70) of at least the upper-side halved bearing (42U) of the second main bearing (42) or the length (L2) of the crush relief (70) of each of the upper-side and lower-side halved bearings (42U, 42L) of the second main bearing (42) is a length corresponding to a circumferential angle of 50° from the circumferential end face (72) of the halved bearing (42U, 42L) at a maximum.

In another embodiment of the present invention, the upper-side halved bearing (42U) of the second main bearing (42) has an oil groove (42G) communicating with the oil hole (45) on an inner circumferential surface thereof.

In another embodiment of the present invention, a circumferential length (L4) of the oil groove (42G) of the upper-side halved bearing (42U) of the second main bearing (42) is smaller than the circumferential length (L3) of the oil groove (41G) of the upper-side halved bearing (41U) of the first main bearing (41).

In the present invention, the length L2 of the crush relief 70 of at least the upper-side halved bearing 42U of the second main bearing 42 for supporting the second journal portion 62 or the length L2 of the crush relief 70 of each of the upper-side and lower-side halved bearings 42U and 42L is larger than the length L1 of the crush relief 70 of each of the upper-side and lower-side halved bearings 41U and 41L of the first main bearing 41.

The viscosity of oil supplied at the time of starting an internal combustion engine is high, and the oil hardly flows to a front side in a rotation direction of the journal portion 62 because a narrow gap between the inner circumferential surface 71 of the upper-side halved bearing 42U of the second main bearing 42 and a surface of the journal portion 62 becomes a flow passage resistance. Meanwhile, the crush relief 70 has a large gap (crush relief gap 70c) between the crush relief 70 and a surface of the journal portion 62, and has a small flow passage resistance to oil flowing in the gap. Therefore, even if the oil has high viscosity, the oil easily flows to a front side in a rotation direction of the journal portion.

The length L2 of the crush relief 70 of the upper-side halved bearing 42U of the second main bearing 42 is long. Therefore, oil supplied between the inner circumferential surface 71 of the upper-side halved bearing 42U of the second main bearing 42 and a surface of the journal portion early reaches the crush relief 70 of the upper-side halved bearing 42U, and oil is further supplied early to a bearing gap between the inner circumferential surface 71 of the lower-side halved bearing 42L and a surface of the second journal portion 62.

Meanwhile, by reducing the length L1 of the crush relief 70 of each of the halved bearings 41U and 41L of the first main bearing 41 for supporting the first journal portion 61, during steady operation of an internal combustion engine, excessive flow of oil from the crush relief gaps 70c at both end portions of the halved bearings 41U and 41L in an axial direction thereof to an outside of the main bearing 41 is suppressed.

DESCRIPTION OF THE EMBODIMENTS

First Embodiment

Figure 1:
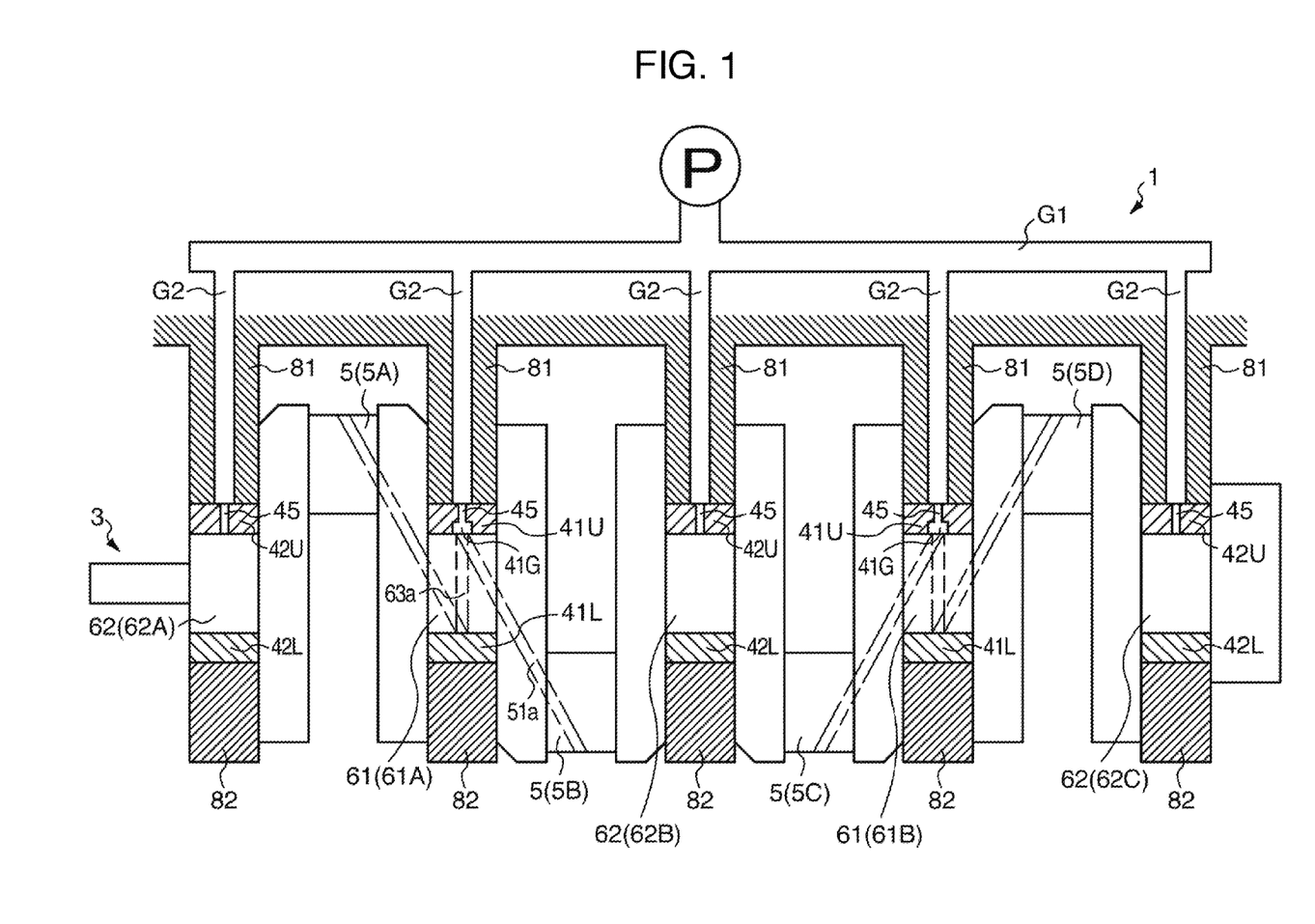
FIG. 1 is a schematic diagram illustrating a bearing device for a crankshaft.
Figure 2:
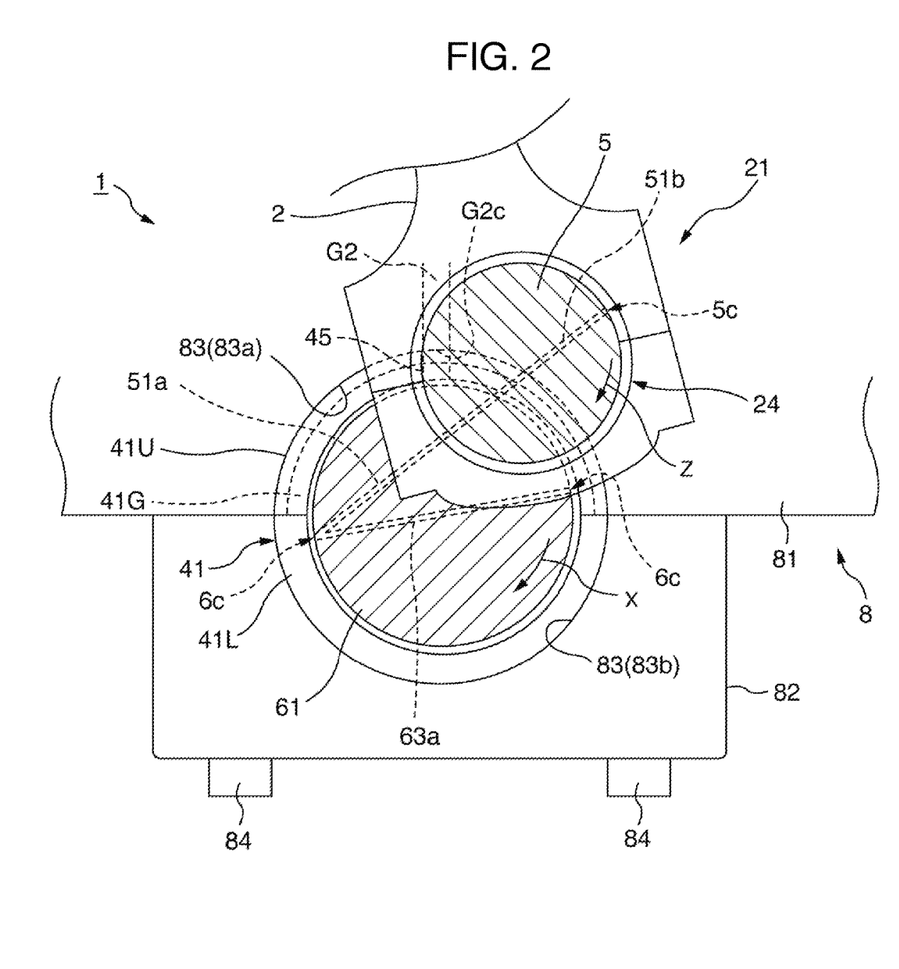
FIG. 2 is a front view of a first journal portion with a lubricating oil passage.
Figure 3:
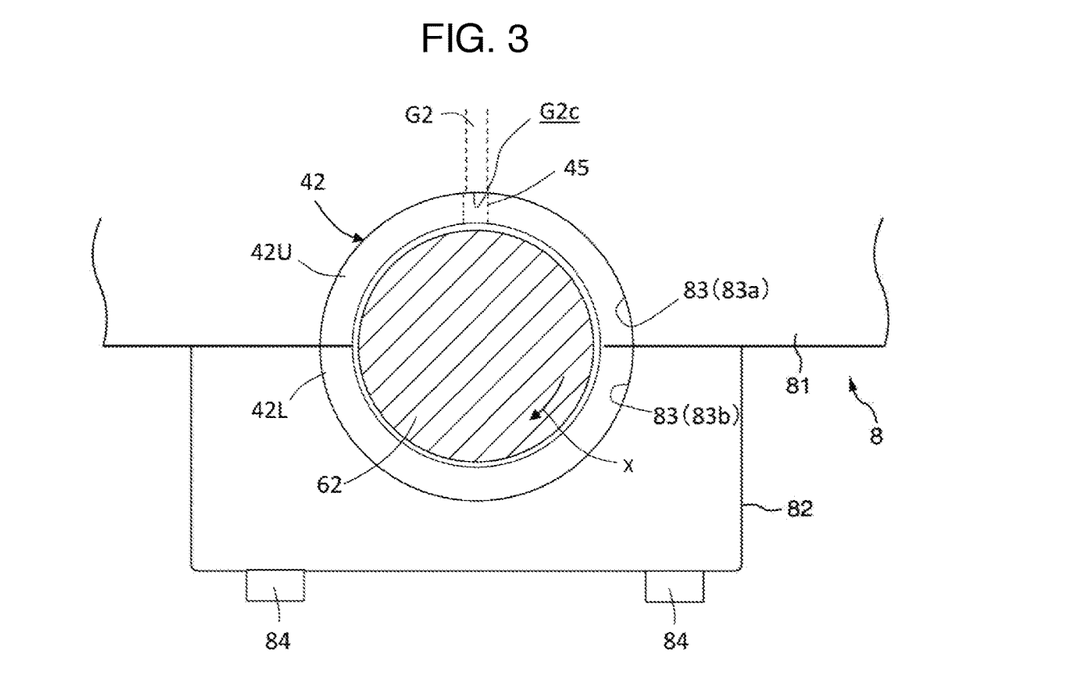
FIG. 3 is a front view of a second journal portion without a lubricating oil passage.

FIG. 1 is a schematic diagram illustrating a bearing device 1 of a crankshaft 3 of the present invention, applied to an in-line four-cylinder internal combustion engine. FIG. 2 illustrates a bearing structure of a journal portion 61 (No. 2 and No. 4 journal portions (61A, 61B) in FIG. 1) with a lubricating oil passage 63a for supplying oil to a crank pin portion 5 of the bearing device 1 illustrated in FIG. 1 (hereinafter, the "journal portion with a lubricating oil passage" is referred to as a "first journal portion"). FIG. 3 illustrates a bearing structure of a journal portion 62 (No. 1, No. 3, and No. 5 journal portions (62A, 62B, 62C) in FIG. 1) without a lubricating oil passage for supplying oil to the crank pin portion 5 of the bearing device 1 illustrated in FIG. 1 (hereinafter, the "journal portion without a lubricating oil passage" is referred to as a "second journal portion").

(Overall Configuration of Bearing Device)

As illustrated in FIG. 1, the bearing device 1 in the present embodiment includes five journal portions 6 (61A, 61B, 62A, 62B, 62C) supported by a cylinder block, and the crankshaft 3 having four crank pin portions 5 (5A to 5D). The crank pin portions 5 are integrally formed with the journal portions 6 among the journal portions 6, and rotate around the journal portions 6. The bearing device 1, as a slide bearing for supporting the crankshaft 3, further includes five main bearings 4 for rotatably supporting the journal portions 6 (61A, 61B, 62A, 62B, 62C), and four connecting rods 2 and four connecting rod bearings 24 (not illustrated in FIG. 1) for rotatably supporting the crank pin portions 5 (5A to 5D). The crankshaft 3 of a small internal combustion engine for a passenger car is made of a Fe alloy, and each of the journal portions 6 has a diameter of about 40 mm to 100 mm. The plurality of journal portions 6 usually has the same diameter.

A first main bearing 41 for supporting a first journal portion 61 includes a pair of halved bearings (an upper-side halved bearing 41U and a lower-side halved bearing 41L), and a second main bearing 42 for supporting a second journal portion 62 includes a pair of halved bearings (an upper-side halved bearing 42U and a lower-side halved bearing 42L). Each of the halved bearing includes a back metal layer made of a Fe alloy and a bearing alloy (Al alloy, Cu alloy, or the like) layer. Each of the main bearings 41 and 42 has an inner diameter corresponding to the diameter of each of the journal portions, and has a wall thickness of about 1.5 mm to 3.0 mm In the cylinder block, a bearing housing 8 is disposed at a position corresponding to each of the journal portions 6. The bearing housing 8 includes an upper-side housing 81 which is a part of the cylinder block, and a lower-side housing 82 which is a bearing cap. The upper-side housing 81 and the lower-side housing 82 have half-cylindrical surfaces 83a and 83b aligned with halved bearings 41U, 41L, 42U, and 42L, respectively. A bearing holding hole 83 having a cylindrical shape is formed when the upper-side housing 81 and the lower-side housing 82 are integrally fastened with bolts 84. The main bearings 41 and 42 each having a cylindrical shape are held in the bearing holding hole 83.

Oil discharged by an oil pump P is fed to an oil gallery G1 formed in a cylinder block wall, and is further fed to five inner oil passages G2 branching off from the oil gallery G1. The inner oil passage G2 is open on the half-cylindrical surface 83a of the upper-side housing 81. In the main bearing 41 of the first journal portion 61, oil flowing out of an opening G2c of the inner oil passage G2 is fed into an oil groove 41G formed on an inner circumferential surface of the main bearing 41 through an oil hole 45 formed through a wall of the main bearing 41. In the main bearing 42 of the second journal portion 62, the oil flowing out of the opening G2c of the inner oil passage G2 is fed into a gap between the inner circumferential surface 71 of the upper-side halved bearing 42U and a surface of the second journal portion 62 through the oil hole 45 formed through a wall of the main bearing 42.

FIG. 1 illustrates the bearing device 1 for the crankshaft 3 of a four-cylinder internal combustion engine. As illustrated in FIG. 1, the numbers No. 1 to No. 5 are given to the five journal portions 6 of the crankshaft 3 from a front (Fr) side toward a rear (Rr) side, and the numbers No. 1 to No.

4 are given to the four crank pin portions 5 from a front (Fr) side toward a rear (Rr) side. A first lubricating oil passage 63a is formed through the No. 2 and No. 4 journal portions 61A and 61B in a diameter direction of the journal portions. Two second lubricating oil passages 51a branching off from the first lubricating oil passage 63a are formed through a crank arm portion. The second lubricating oil passage 51a communicates with a third lubricating oil passage 51b formed through the No. 1 to No. 4 crank pin portions 5A to 5D in a diameter direction thereof. No lubricating oil passage is formed in the Nos. 1, 3, and 5 journal portions 62A, 62B, and 62C. Incidentally, as long as the crankshaft 3 has the plurality of journal portions 6, and the lubricating oil passage 63a is not formed inside at least one of the journal portions, the configuration of the crankshaft 3 is not limited to the configuration illustrated in FIG. 1.

In FIG. 2, a positional relationship in the depth direction of the sheet is such that the first journal portion 61 is disposed on the back side of the sheet, and the crank pin portion 5 is disposed on the front side of the sheet.

The first journal portion 61 is supported by the cylinder block made of an Al alloy of an internal combustion engine through the first main bearing 41. The first main bearing 41 includes a pair of the upper-side halved bearing 41U and the lower-side halved bearing 41L. In the upper-side halved bearing 41U, the oil groove 41G is formed on an inner circumferential surface thereof over the entire circumferential length. The first journal portion 61 has the lubricating oil passage 63a penetrating the first journal portion 61 in a diameter direction thereof. When the first journal portion 61 rotates in the arrow X direction, both end openings 6c of the lubricating oil passage 63a communicate with the oil groove 41G of the first main bearing 41 alternately.

The crank pin portion 5 is supported by a large end housing 21 of the connecting rod 2 through the connecting rod bearing 24 including a pair of halved bearings.

As described above, regarding the first main bearing 41, lubricating oil discharged by the oil pump P is fed into the oil groove 41G formed on an inner circumferential surface of the upper-side halved bearing 41U over the entire circumferential length from the inner oil passage G2 formed in the cylinder block wall through the oil hole 45 formed through a wall of the upper-side halved bearing 41U.

Furthermore, the first lubricating oil passage 63a is formed through the first journal portion 61 in a diameter direction thereof, and both end openings 6c of the first lubricating oil passage 63a communicate with the lubricating oil groove 41G. The second lubricating oil passage 51a branching off from the first lubricating oil passage 63a of the first journal portion 61 is formed through the crank arm portion (not illustrated), and the third lubricating oil passage 51b is formed through the crank pin portion 5 in a diameter direction thereof.

In this way, oil is supplied to a gap formed between the crank pin portion 5 and the connecting rod bearing 24 from a discharge port 5c at an end of the third lubricating oil passage 51b through the first lubricating oil passage 63a and the second lubricating oil passage 51a.

As illustrated in FIG. 3, the second journal portion 62 is supported by the cylinder block made of an Al alloy of the internal combustion engine through the second main bearing 42, and the second main bearing 42 includes a pair of the upper-side halved bearing 42U and the lower-side halved bearing 42L.

As described above, regarding the second main bearing 42, the lubricating oil discharged by the oil pump P is fed into a gap between the inner circumferential surface 71 of the upper-side halved bearing 42U and the second journal portion 62 from the inner oil passage G2 formed in the cylinder block wall through the oil hole 45 formed through a wall of the upper-side halved bearing 42U.

Figure 4:
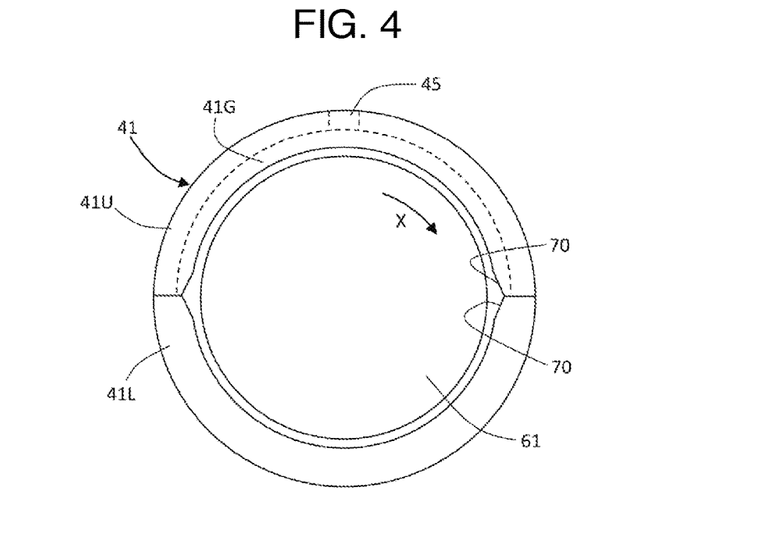
FIG. 4 is a front view of a first main bearing illustrated in FIG. 2.
Figure 5:
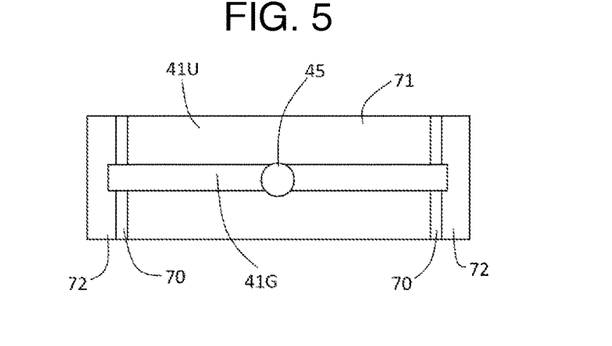
FIG. 5 is a view illustrating an inner circumferential surface side of an upper-side halved bearing illustrated in FIG. 4.

FIG. 4 illustrates a front view of the first main bearing 41 for supporting the first journal portion 61 illustrated in FIG. 2. FIG. 5 illustrates an inner surface of the upper-side halved bearing 41U.

Figure 6:
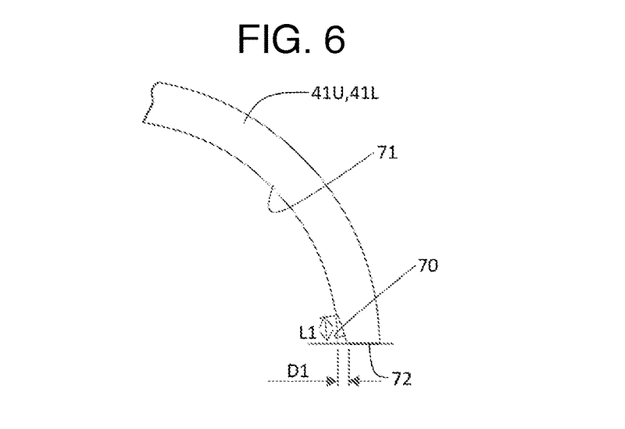
FIG. 6 is a front view of a crush relief portion of the halved bearing illustrated in FIG. 2.

A crush relief 70 is formed in a region adjacent to each of circumferential end faces 72 of the upper-side and lower-side halved bearings 41U and 41L. The crush relief 70 is a wall thickness decreasing region formed such that the wall thickness of the crush relief 70 is smaller than that of the original inner circumferential surface 71 (major arc). The crush relief 70 is disposed intending to form a crush relief gap 70c for absorbing a positional deviation and deformation of a butt end face (circumferential end face 72) in a state where the pair of halved bearings 41U and 41L are assembled into the bearing housing 8 (see, for example, SAE J506 (items 3.26 and 6.4), DIN1497 (section 3.2), and JIS D3102). Generally, in a case of a bearing for a small internal combustion engine of a passenger car, a depth D1 of a crush relief at a circumferential end face of a halved bearing (distance from an original inner circumferential surface to an actual inner circumferential surface) is about 0.01 to 0.075 mm, and a length L1 (circumferential length from a circumferential end face along an inner circumferential surface of the halved bearing to an upper edge of the crush relief 70) corresponds to a circumferential angle of 1° to 10° from the circumferential end face 72 to the upper edge of the crush relief 70 (see FIG. 6). Note that the lengths L1 of the crush reliefs of the upper and lower-side halved bearings 41U and 41L of the first main bearing 41 are equal to each other. Furthermore, the depth D1 and the length L1 of the crush relief are constant over an axial direction of the halved bearings 41U and 41L.

In the first embodiment, in the upper-side halved bearing 41U, the oil groove 41G is formed on an inner circumferential surface thereof over the entire circumferential length. In the first embodiment, each of a groove depth D3 of the oil groove 41G and the axial length of the oil groove 41G (width of the oil groove 41G) has a substantially uniform size over a circumferential direction of the upper-side halved bearing 41U. In a case where the diameter of a journal portion of the crankshaft 3 of a small internal combustion engine is 40 to 100 mm, the depth D1 of the oil groove 41G is about 1 mm to 2.5 mm. The larger the diameter of the journal portion is, the larger the groove depth D3 of the oil groove 41G is.

Furthermore, in the oil groove 41G, the oil hole 45 penetrating a wall of the upper-side halved bearing 41U is formed. In the present embodiment, one of the oil holes 45 is formed at a circumferential central position and an axial central position of the upper-side halved bearing 41U. The diameter of the opening 6c of the lubricating oil passage 63a on a surface of the first journal portion 61 is generally about 3 to 8 mm, and the axial length of the oil groove 41G is slightly larger than the diameter of the opening 6c of the lubricating oil passage 63a. Furthermore, in a case where the oil hole 45 has a circular opening as illustrated in the first embodiment, the diameter of the opening is slightly larger than the axial length of the oil groove 41G.

The oil groove 41G is formed over the entire length of the inner circumferential surface. As a result, one of the two openings 6c of the lubricating oil passage 63a communicates with the oil groove 41G, and therefore oil can be supplied to the crank pin portion 5 constantly.

Incidentally, unlike the present embodiment, both circumferential end portions of the oil groove 41G may be positioned at the crush relief 70. Alternatively, one circumferential end portion of the oil groove 41G may be positioned at the crush relief, and the other circumferential end portion may be positioned on the circumferential end face 72 of the upper-side halved bearing 41U or the inner circumferential surface 71. Alternatively, both circumferential end portions of the oil groove 41G may be positioned on the inner circumferential surface 71. The oil groove 41G may have a maximum axial length of the oil groove 41G in the vicinity of a circumferential central portion of the oil groove 41G, and may have a smaller length toward both circumferential end portions of the oil groove 41G. The oil groove 41G may have the maximum groove depth D3 in the vicinity of a circumferential central portion of the oil groove 41G, and may have a smaller depth toward both circumferential end portions of the oil groove 41G. The oil groove 41G may have the maximum groove depth D3 at one circumferential end portion of the oil groove 41G, and may have a smaller depth toward the other circumferential end portion of the oil groove 41G.

The lower-side halved bearing 41L has the same size and shape as the upper-side halved bearing 41U except that the lower-side halved bearing 41L does not have the configuration of the oil groove 41G or the oil hole 45.

In the bearing device 1 illustrated in FIG. 1, the main bearings 41 for No. 2 and No. 4 journal portions 61A and 61B have the same size and shape as each other.

Figure 7:
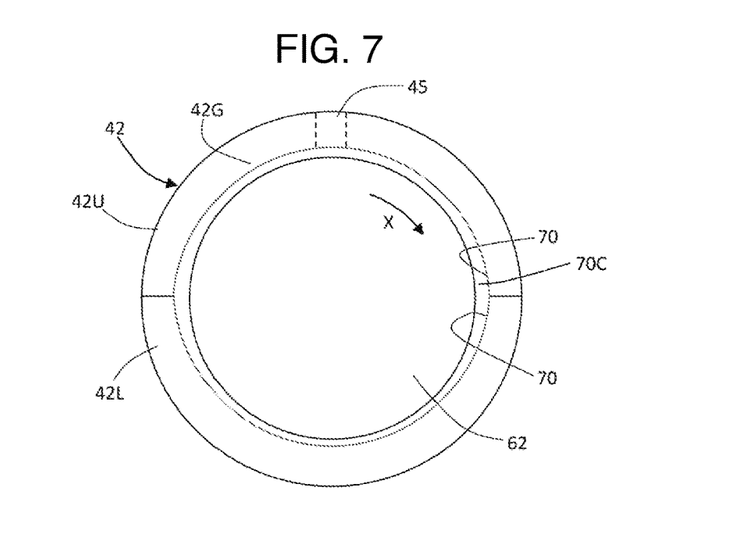
FIG. 7 is a front view of a second main bearing illustrated in FIG. 3.
Figure 8:
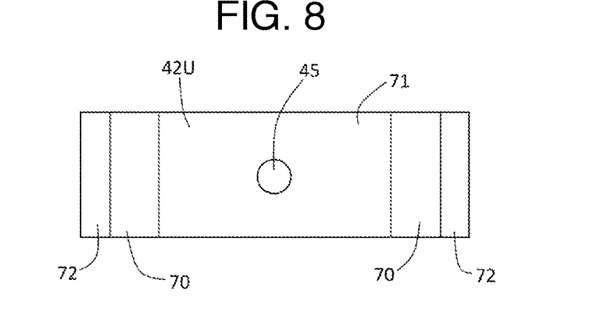
FIG. 8 is a view illustrating an inner circumferential surface side of an upper-side halved bearing illustrated in FIG. 7.

FIG. 7 illustrates a front view of the second main bearing 42 for supporting the second journal portion 62 illustrated in FIG. 3. FIG. 7 illustrates an inner surface of the upper-side halved bearing 42U.

The second main bearing 42 includes a pair of the upper-side halved bearing 42U and the lower-side halved bearing 42L. Each of the upper-side halved bearing 42U and the lower-side halved bearing 42L is formed into a half-cylindrical shape having the same bearing inner diameter, bearing outer diameter, and bearing width as the pair of upper-side and lower-side halved bearings 41U and 41L. Furthermore, in the upper-side halved bearing 42U, the same oil hole 45 as the upper-side halved bearing 41U is formed. Incidentally, the number of the oil holes 45 in each of the upper-side halved bearings 41U and 42U is not limited to one, but may be two or more. Furthermore, the shape of the opening of the oil hole 45 in each of the upper-side halved bearings 41U and 42U is not limited to a circular shape, but may be an elliptical shape or an elongated hole shape.

The crush relief 70 is formed in a region adjacent to each of the circumferential end faces 72 of the upper-side and lower-side halved bearings 42U and 42L. Generally, in a case of a bearing for a small internal combustion engine of a passenger car, a depth D2 (distance from an original inner circumferential surface to an actual inner circumferential surface) of a crush relief in a circumferential end face of a halved bearing is about 0.01 to 0.075 mm. The length L2 of the crush relief 70 of each of the upper-side and lower-side halved bearings 42U and 42L (circumferential length along an inner circumferential surface of each of the halved bearings 42U and 42L) is larger than the length L1 of the crush relief 70 of each of the halved bearings 41U and 41L of the first main bearing 41 (see FIG. 9). The length L2 of the crush relief 70 of each of the halved bearings 42U and 42L of the second main bearing 42 is preferably 1.5 times or more and more preferably twice or more the length L1 of the crush relief 70 of each of the halved bearings 41U and 41L of the first main bearing 41. Furthermore, the length L2 of the crush relief 70 of each of the halved bearings 42U and 42L of the second main bearing 42 is preferably a length corresponding to a circumferential angle of 20° or more from the circumferential end face 72 of each of the halved bearings 42U and 42L. Note that the depth D2 and the length L2 of the crush relief 70 of each of the halved bearings 42U and 42L of the second main bearing 42 are constant over an axial direction of the halved bearings 42U and 42L.

Figure 9:
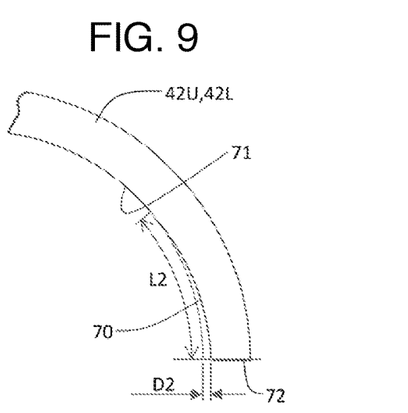
FIG. 9 is a front view of a crush relief portion of the halved bearing illustrated in FIG. 3.

Furthermore, the length L2 of the crush relief 70 of each of the halved bearings 42U and 42L of the second main bearing 42 is preferably a length corresponding to a circumferential angle of 50° from the circumferential end face 72 of each of the halved bearings 42U and 42L at a maximum. When the length L2 of the crush relief 70 is formed so as to be more than the length corresponding to the circumferential angle of 50° from the circumferential end face 72 of each of the halved bearings 42U and 42L, a ratio of the inner circumferential surface 71 supporting the second journal portion 62 is too small In the bearing device 1 illustrated in FIG. 1, the second main bearings 42 of the No. 1, No. 3, and No. 5 journal portions 62A, 62B, and 62C without a lubricating oil passage have the same dimension and shape as one another. Furthermore, each of the second main bearings 42 has the same outer diameter, inner diameter, and bearing width (axial length) as the first main bearing 41 of each of the No. 2 and No. 4 journal portions 61A and 61B. Note that each of the main bearings 41 and 42 may have an outer diameter, an inner diameter, and a bearing width varying according to a journal portion.

The length L2 of the crush relief 70 of each of the halved bearings 42U and 42L of the second main bearing 42 for supporting the second journal portion 62 of the bearing device 1 of the present embodiment is larger than the length L1 of the crush relief 70 of each of the halved bearings 41U and 41L of the first main bearing 41. The viscosity of oil supplied at the time of starting an internal combustion engine is high, and the oil hardly flows to a front side in a rotation direction of the journal portion 62 because a narrow gap between the inner circumferential surface 71 of the halved bearing 42U of the second main bearing 42 and a surface of the journal portion 62 becomes a flow passage resistance. Meanwhile, the crush relief 70 has a large gap (crush relief gap 70c) between the crush relief 70 and a surface of the journal portion 62, and has a small flow passage resistance to oil flowing in the gap. Therefore, even if the oil has high viscosity, the oil easily flows to a front side in a rotation direction of the journal portion. The length L2 of the crush relief 70 of the upper-side halved bearing 42U is long. Therefore, oil supplied between the inner circumferential surface 71 of the upper-side halved bearing 42U of the second main bearing 42 and a surface of the journal portion early reaches the crush relief 70 of the upper-side halved bearing 42U, and oil is further supplied early to a bearing gap between the inner circumferential surface 71 of the lower-side halved bearing 42L and a surface of the second journal portion 62.

Meanwhile, by reducing the length L1 of the crush relief 70 of each of the halved bearings 41U and 41L of the first main bearing 41 for supporting the first journal portion 61, during steady operation of an internal combustion engine, excessive flow of oil from the crush relief gaps 70c at both end portions of the halved bearings 41U and 41L in an axial direction thereof to an outside of the main bearing 41 is suppressed.

Incidentally, in the present embodiment, the length L2 of the crush relief 70 of each of the upper-side halved bearing 42U and the lower-side halved bearing 42L of the second main bearing 42 is larger than the length L1 of the crush relief 70 of each of the halved bearings 41U and 41L of the first main bearing 41. However, unlike the present embodiment, the length L2 of the crush relief 70 of the lower-side halved bearing 42L of the second main bearing 42 can be the same as the length L1 of the crush relief 70 of each of the halved bearings 41U and 41L of the first main bearing 41. In addition, the inner circumferential surface 71 of each of the halved bearings 41U, 41L, 42U, and 42L and a surface of the crush relief 70 may have processing streaks due to cutting work at the time of manufacturing a bearing.

Second Embodiment

Hereinafter, a second main bearing 42A for supporting a second journal portion 62, including an upper-side halved bearing 42AU having a different form from the first embodiment will be described with reference to FIGS. 10 to 13. Note that description of portions which are the same as or equivalent to contents described in the first embodiment will be described by giving the same reference signs thereto.

(Configuration)

Figure 10:
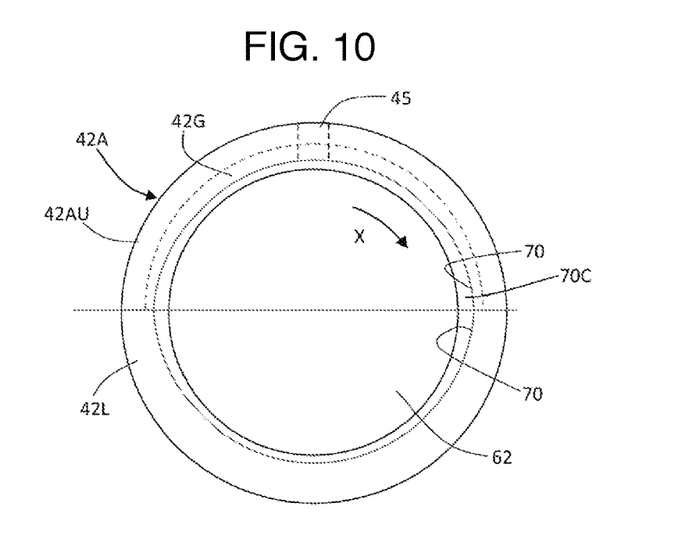
FIG. 10 is a front view of a second main bearing in a second embodiment.
Figure 11:
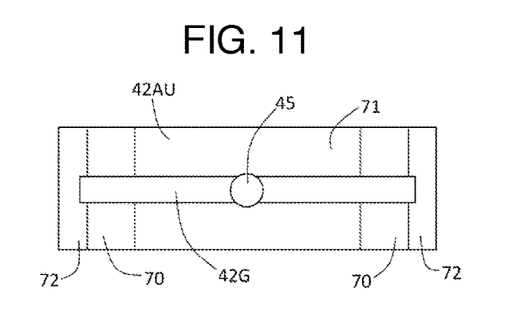
FIG. 11 is a bottom view of an upper-side halved bearing illustrated in FIG. 10.
Figure 12:
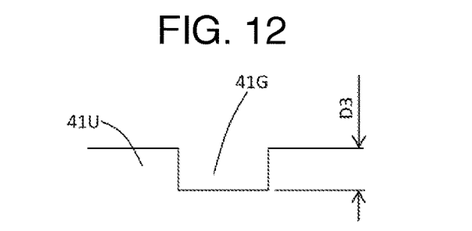
FIG. 12 is a cross-sectional view of an oil groove of the upper-side halved bearing.
Figure 13:
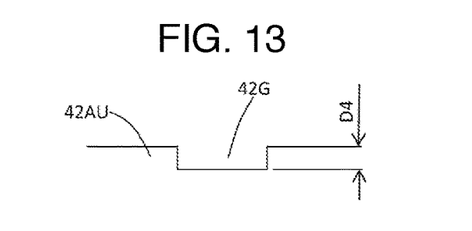
FIG. 13 is a cross-sectional view of an oil groove of the upper-side halved bearing.

First, a configuration will be described. The configuration of a first main bearing 41 for supporting a first journal portion 61 of the present embodiment is similar to that of the first embodiment. The configuration of the second main bearing 42A is substantially similar to that of the first embodiment except for the shape of an oil groove 42G of the upper-side halved bearing 42AU.

Specifically, in the upper-side halved bearing 42AU of the second main bearing 42A in the present embodiment, the oil groove 42G is formed on an inner circumferential surface over the entire circumferential length. In the second embodiment, each of a groove depth D4 of the oil groove 42G and the axial length of the oil groove 42G (width of the oil groove 42G) has a substantially uniform size over a circumferential direction of the upper-side halved bearing 42AU. The axial length of the oil groove 42G is preferably the same as the axial length of the oil groove 41G of the upper-side halved bearing 41U of the first main bearing 41. When the diameter of a journal portion of a crankshaft 3 of a small internal combustion engine is 40 to 100 mm, the depth D4 of the oil groove 42G is about 0.2 mm to 2.5 mm. The larger the diameter of the journal portion is, the larger the groove depth D4 of the oil groove 42G is. Furthermore, the groove depth D4 (see FIG. 13) of the oil groove 42G is smaller than the groove depth D3 (See FIG. 12) of the oil groove 41G of the upper-side halved bearing 41U of the first main bearing 41.

Furthermore, in the oil groove 42G, an oil hole 45 penetrating a wall of the upper-side halved bearing 42AU is formed. In the present embodiment, one of the oil holes 45 is formed at a circumferential central position and an axial central position of the upper-side halved bearing 42AU.

(Effect)

At the time of starting an internal combustion engine, due to formation of the oil groove 42G on an inner circumferential surface 71 of the upper-side halved bearing 42AU, oil having high viscosity is easily fed to a crush relief gap 70c and is supplied earlier to a bearing gap between the inner circumferential surface 71 of a lower-side halved bearing 42L and a surface of the second journal portion 62. Furthermore, in the present embodiment, the groove depth D4 of the oil groove 42G is smaller than the groove depth D3 of the oil groove 41G, and therefore the internal volume of the oil groove 42G is small. The amount of oil supplied to the second main bearing 42A can be reduced during normal operation of an internal combustion engine.

Incidentally, in the present embodiment, the groove depth D4 of the oil groove 42G of the upper-side halved bearing 42U of the second main bearing 42A is smaller than the groove depth D3 of the oil groove 41G of the upper-side halved bearing 41U of the first main bearing 41. However, unlike the present embodiment, the groove depth D4 of the oil groove 42G may be equal to or larger than the groove depth D3 of the oil groove 41G. In addition, as a cross section of each of the oil grooves 41G and 42G, a rectangular shape has been described, but the shape is not limited thereto. Furthermore, the oil groove 42G of the upper-side halved bearing 42AU of the second main bearing 42A is formed over the entire circumferential length of an inner circumferential surface of the upper-side halved bearing 42AU. However, unlike the embodiment, the oil groove 42G may be partially formed on the inner circumferential surface of the upper-side halved bearing 42AU.

Third Embodiment

Hereinafter, a first main bearing 41A for supporting a first journal portion 61, including an upper-side halved bearing 41AU having a different form from the first and second embodiments, and a second main bearing 42B for supporting a second journal portion 62, including an upper-side halved bearing 42BU will be described with reference to FIGS. 14 to 17. Note that description of portions which are the same as or equivalent to contents described in the first and second embodiments will be described by giving the same reference signs thereto.

(Configuration)

Figure 14:
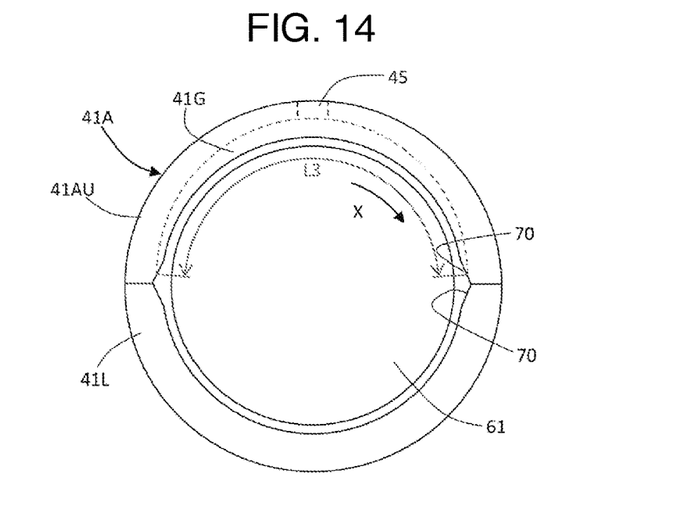
FIG. 14 is a front view of a first main bearing in a third embodiment.
Figure 15:
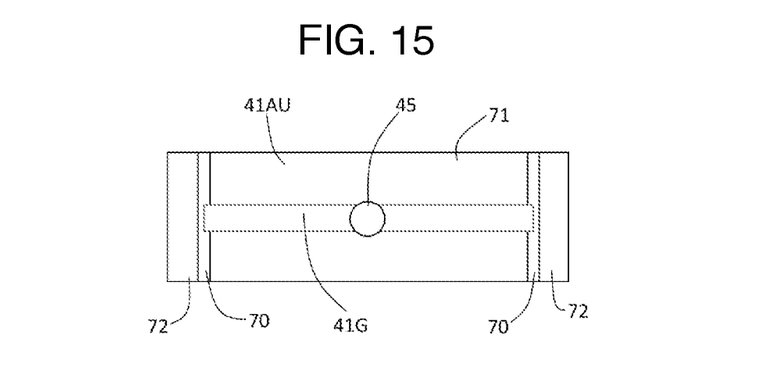
FIG. 15 is a bottom view of an upper-side halved bearing illustrated in FIG. 14.
Figure 16:
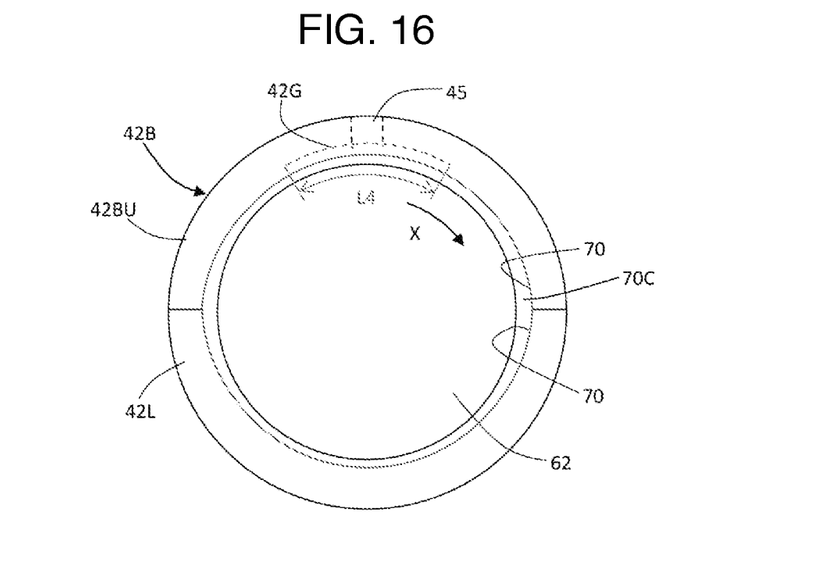
FIG. 16 is a front view of a second main bearing in the third embodiment.

First, a configuration will be described. The configuration of the first main bearing 41A for supporting the first journal portion 61 of this embodiment is substantially similar to that of the first embodiment except for an oil groove 41G of the upper-side halved bearing 41AU, and the configuration of the second main bearing 42B for supporting the second journal portion 62 is substantially similar to those of the first and second embodiments except for an oil groove 42G of the upper-side halved bearing 42BU.

Specifically, in the upper-side halved bearing 41AU of the first main bearing 41A of the present embodiment, the oil groove 41G is formed on an inner circumferential surface so as to be shorter than the entire circumferential length of the halved bearing 41U, and both circumferential end portions of the oil groove 41G are positioned at the crush relief 70. A groove depth D3 of the oil groove 41G is maximum in the vicinity of a central portion of the circumferential length of the oil groove 41G and is reduced toward both circumferential end portions. The oil groove 42G is formed partially in a circumferential direction on an inner circumferential surface of the upper-side halved bearing 42BU of the second main bearing 42B, and both circumferential end portions of the oil groove 42G are positioned on the inner circumferential surface 71 of the upper-side halved bearing 42BU. Furthermore, the oil groove 42G has an oil hole 45 penetrating a wall of the upper-side halved bearing 42BU. In the present embodiment, one of the oil holes 45 is formed at a circumferential central position and an axial central position of the upper-side halved bearing 42BU. A groove depth D3 of the oil groove 41G is constant in a circumferential direction of the oil groove 41G. A groove depth D4 of the oil groove 42G is preferably smaller than the groove depth D3 of the oil groove 41G of the upper-side halved bearing 41AU at a corresponding position in a circumferential direction over the entire circumferential length (at any position in the circumferential direction). A circumferential length L4 of the oil groove 42G of the upper-side halved bearing 42BU of the second main bearing 42B along an inner circumferential surface of the halved bearing 42BU is smaller than a circumferential length L3 of the oil groove 41G of the upper-side halved bearing 41AU of the first main bearing 41A along an inner circumferential surface of the upper-side halved bearing 41AU. In addition, the circumferential length L4 of the oil groove 42G is preferably not more than half of the circumferential length L3 of the oil groove 41G.

(Effect)

Figure 17:
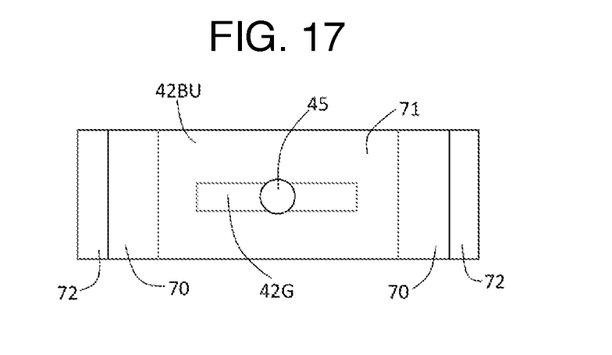
FIG. 17 is a bottom view of an upper-side halved bearing illustrated in FIG. 16.

At the time of starting an internal combustion engine, due to formation of the oil groove 42G on the inner circumferential surface 71 of the upper-side halved bearing 42BU, oil having high viscosity is easily fed to a crush relief gap 70c and is supplied earlier to a bearing gap between the inner circumferential surface 71 of a lower-side halved bearing 42L and a surface of the second journal portion 62. Furthermore, the circumferential length L4 of the oil groove 42G of the upper-side halved bearing 42BU is smaller than the circumferential length L3 of the oil groove 41G of the upper-side halved bearing 41AU of the first main bearing 41A, and the internal volume of the oil groove 42G is small. The amount of oil supplied to the second main bearing 42B can be reduced during normal operation of an internal combustion engine.

Note that the oil groove 41G of the upper-side halved bearing 41AU of the first main bearing 41A and the oil groove 42G of the upper-side halved bearing 42BU of the second main bearing 42B described in the third embodiment can be changed as follows. Both circumferential end portions of the oil groove 41G may be open on a circumferential end face 72 of the upper-side halved bearing 41AU. Alternatively, one circumferential end portion of the oil groove 41G may be positioned at a crush relief, and the other circumferential end portion may be positioned on the circumferential end face 72 of the upper-side halved bearing 41AU or the inner circumferential surface 71. Alternatively, both circumferential end portions of the oil groove 41G may be positioned on the inner circumferential surface 71. If a relationship that the length L4 of the oil groove 42G is smaller than the length L3 of the oil groove 41G is satisfied, the position of a circumferential end portion of the oil groove 42G can be set at any position.

The invention claimed is:

1. A bearing device for a crankshaft of an internal combustion engine, comprising: a crankshaft having a plurality of journal portions and a plurality of crank pin portions; main bearings for supporting the crankshaft; and a bearing housing for holding the main bearing, wherein
the plurality of journal portions includes a first journal portion with a lubricating oil passage for feeding oil to the crank pin portions of the crankshaft, and a second journal portion without the lubricating oil passage,
the first journal portion is supported by a first main bearing, and the first main bearing includes a pair of an upper-side halved bearing and a lower-side halved bearing each having a half-cylindrical shape,
the second journal portion is supported by a second main bearing, and the second main bearing includes a pair of an upper-side halved bearing and a lower-side halved bearing each having a half-cylindrical shape,
the bearing housing includes an upper-side housing and a lower-side housing, the upper-side housing has a half-cylindrical surface aligned with an outer circumferential surface of the upper-side halved bearing, the lower-side housing has a half-cylindrical surface aligned with an outer circumferential surface of the lower-side halved bearing, the upper-side halved bearing is held on the half-cylindrical surface of the upper-side housing, and the lower-side halved bearing is held on the half-cylindrical surface of the lower-side housing,
an inner oil passage for supplying oil to the first and second main bearings is formed inside the upper-side housing, and an opening of the inner oil passage is formed on the half-cylindrical surface of the upper-side housing,
the upper-side halved bearings out of the pair of halved bearings have at least one oil hole,
the upper-side halved bearing of the first main bearing has an oil groove,
the oil hole penetrates a bearing wall thickness of the upper-side halved bearings, and is open on an outer circumferential surface,
the opening of the inner oil passage of the upper-side housing and the oil groove of the upper-side halved bearing of the first main bearing communicate with each other through the oil hole,
the opening of the inner oil passage of the upper-side housing and an inner circumferential surface of the upper-side halved bearing of the second main bearing communicate with each other through the oil hole,
each of the upper-side and lower-side halved bearings has crush reliefs formed at both circumferential end portions of an inner circumferential surface thereof,
lengths of the crush reliefs of the upper-side and lower-side halved bearings of the first main bearing are the same as each other, and
a length of the crush relief of at least the upper-side halved bearing of the second main bearing or a length of the crush relief of each of the upper-side and lower-side halved bearings of the second main bearing is larger than the length of the crush relief of each of the upper-side and lower-side halved bearings of the first main bearing.

2. The bearing device for a crankshaft of an internal combustion engine according to claim 1, wherein the length of the crush relief of at least the upper-side halved bearing of the second main bearing or the length of the crush relief of each of the upper-side and lower-side halved bearings is equal to or longer than twice the length of the crush relief of each of the upper-side and lower-side halved bearings of the first main bearing.

3. The bearing device for a crankshaft of an internal combustion engine according to claim 1, wherein the length of the crush relief of at least the upper-side halved bearing of the second main bearing or the length of the crush relief of each of the upper-side and lower-side halved bearings is a length corresponding to a circumferential angle of 50° from a circumferential end face of the halved bearing at a maximum.

4. The bearing device for a crankshaft of an internal combustion engine according to claim 1, wherein the upper-side halved bearing of the second main bearing has an oil groove communicating with the oil hole on an inner circumferential surface thereof.

5. The bearing device for a crankshaft of an internal combustion engine according to claim 4, wherein a circumferential length of the oil groove of the upper-side halved bearing of the second main bearing is smaller than a circumferential length of the oil groove of the upper-side halved bearing of the first main bearing.

* * * * *